United States Patent [19]

Reinsma

[11] 3,841,718

[45] Oct. 15, 1974

[54] AUGMENTED CRESCENT SEAL WITH COMPENSATING LOAD RING

[75] Inventor: Harold L. Reinsma, Dunlap, Ill.

[73] Assignee: Caterpillar Tractor Co., Peoria, Ill.

[22] Filed: Oct. 25, 1972

[21] Appl. No.: 300,817

Related U.S. Application Data

[63] Continuation-in-part of Ser. No. 116,157, Feb. 17, 1971, abandoned.

[52] U.S. Cl..................... 305/11, 277/164, 277/206
[51] Int. Cl.............................................. F16j 15/38
[58] Field of Search......... 277/206, 164; 305/11, 58

[56] References Cited
UNITED STATES PATENTS

| | | | |
|---|---|---|---|
| 3,027,909 | 4/1962 | Swain | 277/206 |
| 3,554,567 | 1/1971 | Carroll | 277/164 |
| 3,554,588 | 1/1971 | Reinsma | 305/58 |
| 3,614,113 | 10/1971 | Burk | 305/11 |

*Primary Examiner*—Richard J. Johnson
*Attorney, Agent, or Firm*—Phillips, Moore, Weissenberger Lempio & Strabala

[57] ABSTRACT

A seal for a joint subjected to oscillatory motion has a crescent-shaped seal ring partially encompassing a load ring. The crescent-shaped seal ring has a driving flange, a sealing flange and a thin flexible hinge section connecting the two flanges. The load ring fits within the seal ring to press the driving flange into an interference fit with the counterbore walls to cause the driving torque to be transmitted through the seal ring, while the load ring transmits most of the force with which the sealing flange is urged into sealing engagement with an adjacent surface. The seal ring is made of a tough abrasion-resistant material. The load ring is made of elastomeric material having good spring characteristics over a wide operating temperature range. The combination of the materials and geometries of the seal ring and load ring is is such that the seal ring can be selected primarily for good abrasion, torsional and rotary sealing characteristics without regard to spring characteristics, and the load ring can be selected primarily for good spring characteristics at varying temperatures without regard to abrasion, torsional or sealing characteristics.

19 Claims, 7 Drawing Figures

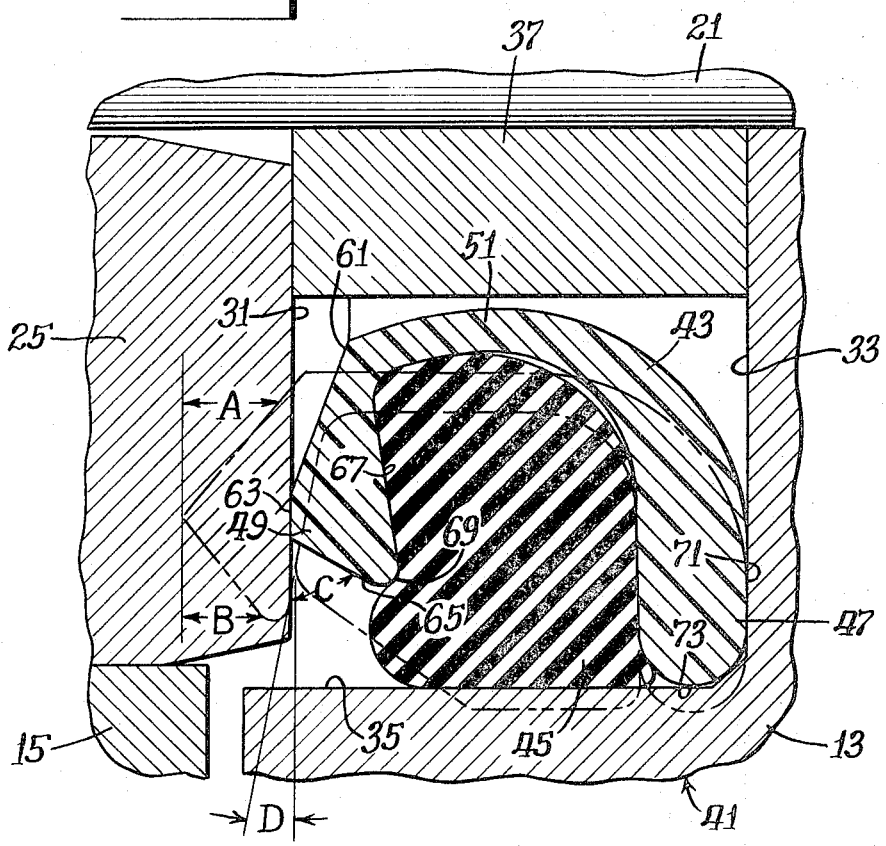
Fig_3
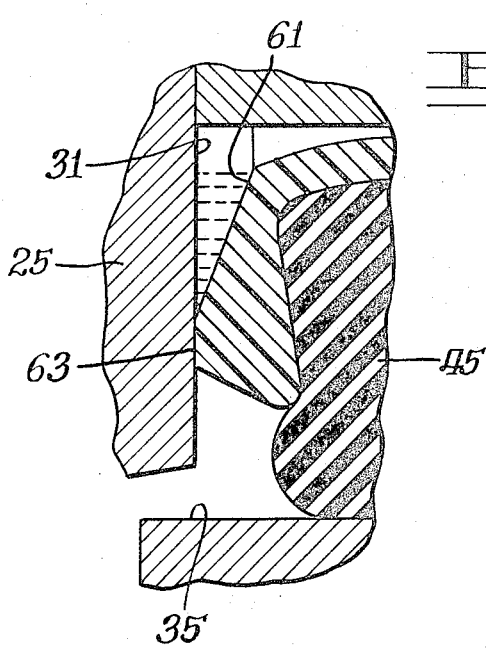
Fig_4

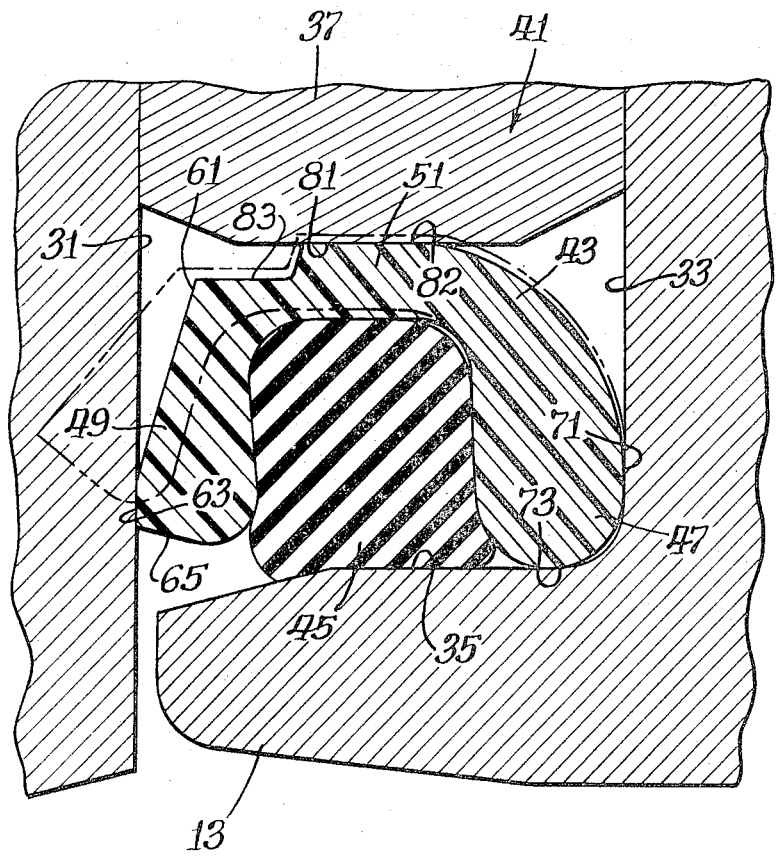
Fig_5

Fig_6.
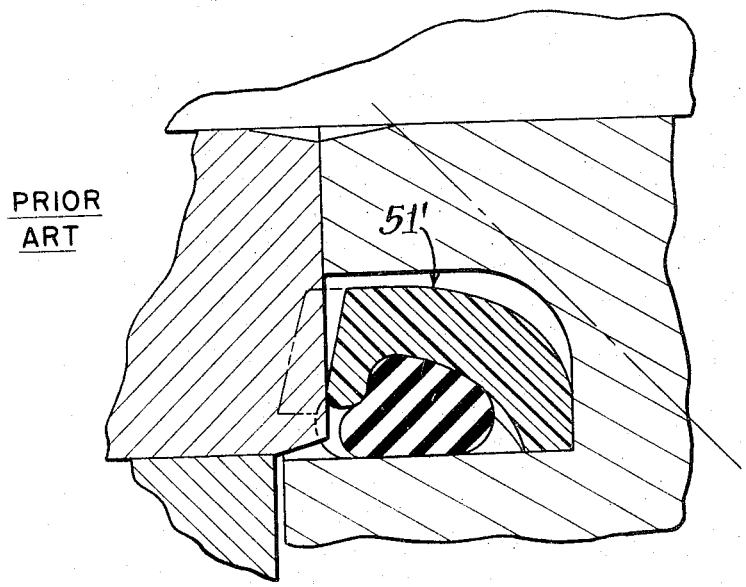
PRIOR ART
Fig_7.
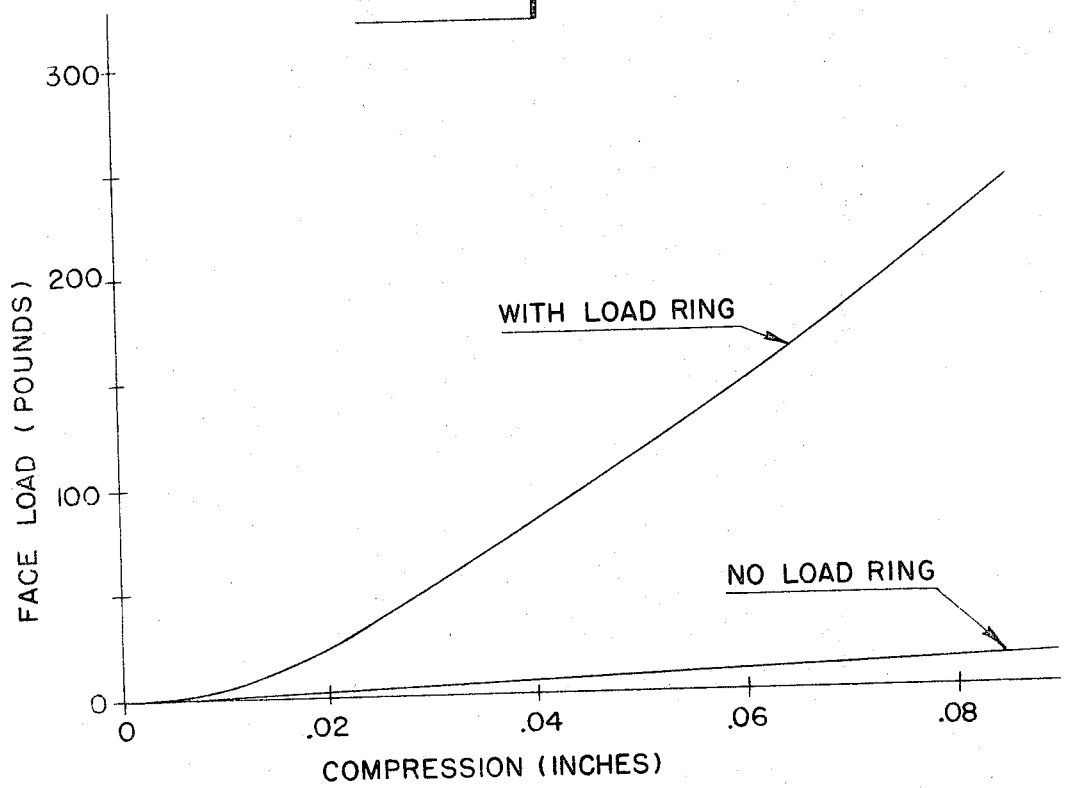

AUGMENTED CRESCENT SEAL WITH COMPENSATING LOAD RING

BACKGROUND OF THE INVENTION

This is a continuation-in-part of a U.S. Pat. application Ser. No. 116,157, filed Feb. 17, 1971 and now abandoned.

This invention relates to a seal and more particularly to a seal for a linkage, such as a track linkage, which is subject to oscillatory motion under widely varying temperature conditions.

My U.S. Pat. No. 3,390,922 issued July 2, 1968, and assigned to the same assignee as the present application, discloses a track pin seal. The FIG. 4 embodiment of my U.S. Pat. No. 3,390,922 shows a generally crescent-shaped seal ring and an O-shaped load ring combination which has been found to be effective so long as the total axial bushing and seal travel is held to a minimum. In the FIG. 4 embodiment of U.S. Pat. No. 3,390,922 the generally crescent-shaped seal ring is deformed as a Belleville to produce the desired face load. The O-ring serves primarily as a resilient filler for the space outboard the seal to prevent this area from becoming packed with dirt which could immobilize the seal. The O-ring also serves an auxilliary function as a secondary static seal.

As noted above, the FIG. 4 embodiment of U.S. Pat. No. 3,390,922 has been found to be effective so long as the total axial bushing and seal travel is held to a minimum. However, in severe usage, the links tend to loosen on the press-fitted pin and move away from contact with the internal thrust control surface. This increases end clearances in the joint and allows the bushing to move laterally on the pin when loaded in thrust. It has been learned that as this lateral travel increases, the generally crescent-shaped seal ring of the FIG. 4 embodiment of U.S. Pat. No. 3,390,922 is incapable of following quickly enough to continuously maintain effective sealing contact with the bushing. This problem has been particularly acute when the track joint is operated at cold temperatures. The generally crescent-shaped seal ring of the FIG. 4 embodiment must be constructed of relatively hard material to have good abrasion-resistance qualities, and cannot therefore provide the spring characteristics required under the conditions of lateral movement as described above, particularly at low temperatures. When the seal ring does not maintain contact with the bushing, leakage and ultimate seal and joint failure can result.

It is a primary object of the present invention to construct a seal which overcomes the above noted problems of the prior art seals.

In accordance with the present invention, a seal ring is composed of a tough, abrasion-resistant material. The seal ring has a driving flange which is engaged in non-rotative driving contact with the counterbore and a sealing flange engaged in annular rotative contact with an end face of a member to be sealed. A thin wall section of the seal ring connects the flanges and provides a flexible hinge connection. A load ring of elastomeric material having substantial resilience is disposed within the annular groove of the seal ring and is axially compressed between the driving flange and the sealing flange. Because of the flexible hinge in the seal ring, the resilient load ring substantially develops axial force for maintaining the sealing flange of the seal ring in engagement with the end face of the member to be sealed.

While the seal of the present invention has some similarity in appearance with the seal shown in FIG. 4 of my U.S. Pat. No. 3,390,922, the specific structure and mode of operation of the seal of the present invention is quite different from that shown in FIG. 4 of U.S. Pat. No. 3,390,922.

As described in greater detail below, the thin flexible hinge section in the seal ring of the present invention provides a substantial distinction over the prior art seal noted above. Because of the thin hinge section, the preferred embodiment of the present invention derives virtually all of its face seal load from compression of the load ring which may be specifically selected to perform that function as well as providing good retraction (spring back) characteristics for the seal.

The present seal requires the presence of the load ring as an integral means of accomplishing a rotary seal between relatively moving members.

The prior art seal in the above patent derives almost all of its seal face load from deflection of the thick seal ring itself (similarly as in a Belleville seal). It is again emphasized that the load ring of the prior art seal noted above is of relatively soft material and acts as a filler or auxiliary (static) seal.

It is further noted that although the driving flange and sealing flange of the seal ring in the present invention form a deeper annular groove because of the thin interconnecting section, the present seal ring still tends to retain a crescent-like shape.

It is a specific object of the present invention to construct the seal ring and the load ring with specific geometries and to use specific materials for the manufacture of the seal ring and load ring such that the seal ring can be designed to produce primarily only a driving and sealing function while the load ring need provide primarily only good spring characteristics, preferably over a wide operating temperature range.

It is a further specific object of the present invention to form the load ring with a polygonal shape in cross-section, the polygonal cross-section of the ring preferably being canted to produce a radially inwardly directed force under axial compression to counteract a tendency of the sealing flange of the seal ring to expand radially outwardly during the compression produced by relative lateral movement within the linkage components. The achievement of this objective maintains the band of sealing contact at substantially the same radial location during dynamic operation of a linkage.

Other objects and advantages of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

BRIEF DESCRIPTION OF THE DRAWINGS

FIG. 3 is a cross-sectional view taken along the line in the direction indicated by the arrow III—III in FIG. 2;

FIG. 4 is a fragmentary view like FIG. 3 showing how the tapered seal face produces an oil wedge to feed lubricant to the seal band;

FIG. 5 is a cross-sectional view like FIG. 3 of another embodiment of the seal of the present invention;

FIG. 6 is a fragmentary view in section of a PRIOR ART seal similar to FIG. 4 of U.S. Pat. No. 3,390,922 illustrated here for purposes of comparison with the present invention; and FIG. 7 is a graphical representation illustrating the direct function of the load ring in the present invention for accomplishing a dynamic seal.

The seal of the present invention can be used in a number of linkages, for example, in a track seal, in a cartridge joint seal, in steering linkages, in articulated joints, in diagonal brace joints, etc.

The seal of the present invention has particular utility in track joints, and is described below with reference thereto.

Figure 1:
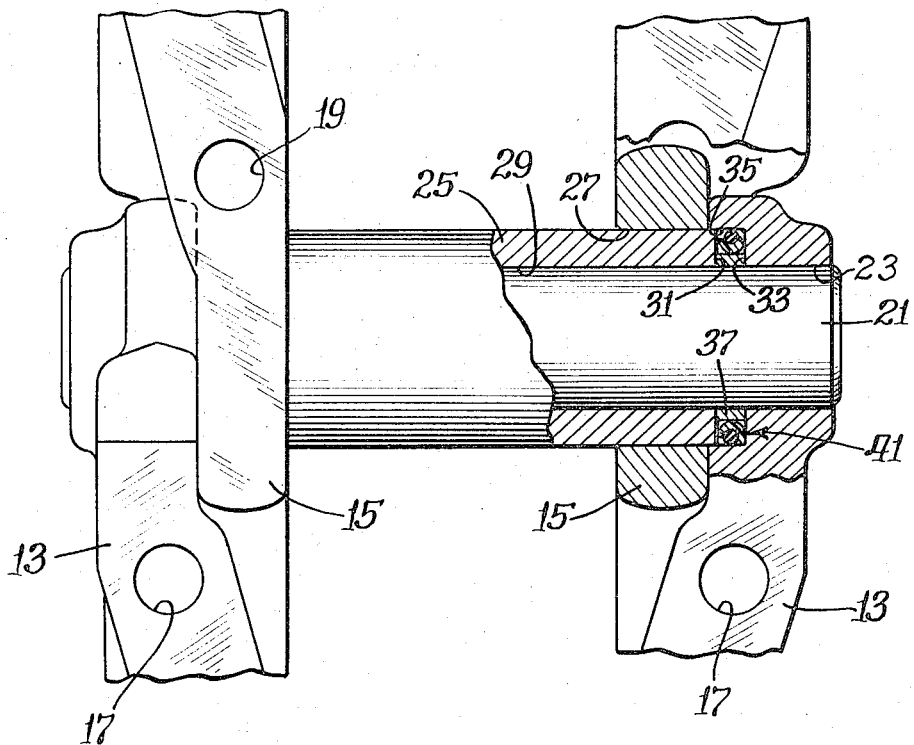
FIG. 1 is a fragmentary plan view, partially broken away to show details of construction, of a track linkage incorporating a seal constructed in accordance with one embodiment of the present invention.
Figure 2:
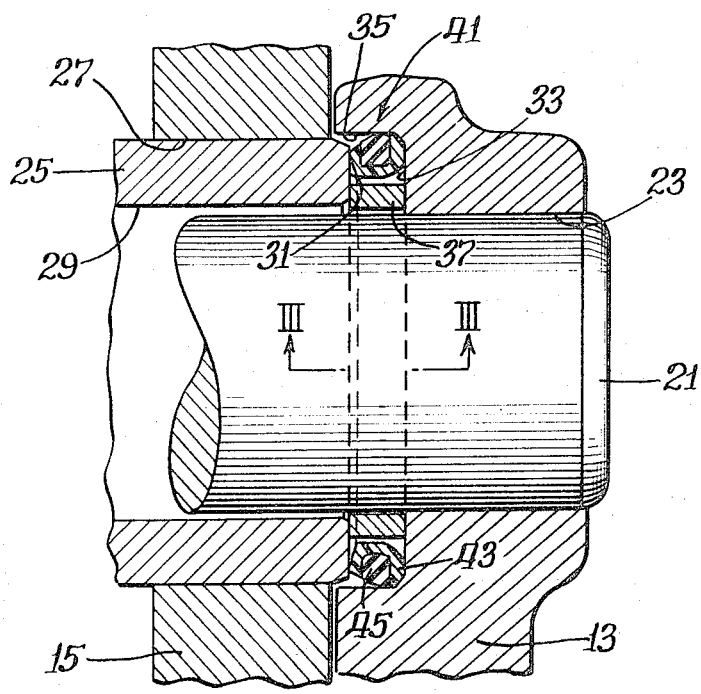
FIG. 2 is an enlarged view of the seal shown in FIG. 1.

In FIG. 1, a portion of an endless track (less the track shoes) in a track mechanism for a track type tractor is indicated generally by the reference numeral 11.

The track mechanism 11 includes outer links 13 and inner links 15. Track shoes (not shown in the drawings) are connected to the links 13 and 15 by bolts which extend through bolt holes 17 and 19.

The overlapping ends of the links 13 and 15 are connected in a pin joint connection for relative rotation by a pin 21. The bushing 25 is connected to the inner links 15, usually by a press fit connection between the bushing and a bore 27 in each end of the inner link 15.

Thus, during relative rotation of the links 13, as happens when the track passes over the sprocket, the pin 21 rotates within the inner bore 29 of the bushing. During relative rotation of the links 13 and 15, the axially directed end face 31 of the bushing rotates with respect to an end wall 33 of a counterbore 35 formed in the link 13.

The seal of the present invention, indicated generally by the reference numeral 41, is disposed within the counterbore or annular cavity 35 to prevent leakage of lubricants from within the inner bore 29 of the bushing and to prevent the entry of foreign matter into the inner bore 29 of the bushing.

As illustrated in FIG. 1 a thrust ring 37 may be used to provide spacing between the overlapping ends of the links 13 and 15. Alternatively, the link 13 may be machined to incorporate the thrust ring integrally with the link.

Although the track mechanism shown in FIG. 1 has relatively little lateral shifting of the links 13 and 15 toward and away from each other after initial assembly, the conditions to which the track mechanism are subjected in operation can very quickly cause the track mechanism to develop substantial play permitting such lateral shifting. It is not unusual for a gap of a sixteenth of an inch to develop, primarily because of slippage in the press fit connection at 23 and 27 as described above. The gap can shift from one side of the track to another very quickly, within a small fraction of a second.

The seal 41, to be effective, must be able to accommodate such rapid lateral shifting, often at quite low temperatures.

In accordance with the present invention, the seal 41 incorporates a seal ring 43 and a load ring 45.

As best shown in FIG. 3 the seal ring 43 has a crescent shape in cross-section. The seal ring 43 has a driving flange 47 and a sealing flange 49. The two flanges are connected by a thin wall section 51 which provides a flexible hinge section between these flanges.

The configurations of the seal ring 43 and the load ring 45 in their free states (that is, prior to being assembled in the linkage mechanism) is shown by the phantom outline in FIG. 3.

The thin wall section 51 is of minimum thickness to provide maximum flexibility.

Because of this flexibility, almost all of the seal face load must be derived from the load ring 45.

Since the load ring 45 is protected from the lubricant inside the bore 29 of the bushing, the load ring 45 can be made of an elastomer having excellent spring response characteristics even at very low temperatures. The load ring 45 thus keeps the seal ring in intimate contact (in a manner that will be described in greater detail below) with the end face 31 of the bushing over a wide range of temperatures and lateral movements. The load ring also automatically compensates for wear that may have occurred to the seal face of the seal ring or to the seal face of the bushing end.

A suitable material for the load ring 45 is a natural rubber. A blend of 50 per cent natural rubber and 50 per cent polybutadiene rubber has also been found to produce a suitable material for the load ring 45.

A suitable material for the seal ring 43 has been found to be a polyurethane elastomer having the following composition: A reaction product of a polyether glycol such as poly (1,4-oxybutylene) glycol with an excess of a diisocyanate such as 2,4- or 2,6- toluene diisocyanate to form a prepolymer of 1,500 to 3,000 molecular weight. This prepolymer cured with a reactive diamine such as methylene-bis-orthochloroaniline.

The flange 49 of the seal ring has a seal face 61. The seal face 61 is trimmed on the seal ring in the free state of the seal ring. When the seal is assembled, a small annular part of the seal face 61 is pressed into contact with the surface 31 of the bushing to form a seal band 63.

The seal face angle A (the angle between the face 61 and the vertical as shown in FIG. 3) is carefully chosen so that under maximum compression, a positive clearance oil wedge angle exists between the face 61 and the surface 31 of the bushing.

This oil wedge is shown in FIG. 4. The oil wedge is important to feed lubricant to the seal band 63.

Also, the combination of the angle A and the face load exerted by the load ring 45 tends to control the width of the seal band 63. A sealing band that is too narrow will leak due to small eccentricities of the seal or the bushing. A sealing band that is too wide tends to starve the outside diameter portion of the seal band and tends to cause rapid seal wear. A seal band width between 0.010 and 0.080 inch width is acceptable for a track seal. A seal band width of about 0.035 inch is believed ideal. A seal face load between 40 and 1,000 lbs. is acceptable with about 300 lbs. being optimum for the preferred embodiment.

The angle of taper of the seal face 61 with its oil wedge feeding lubricant not only produces long seal life within itself, but as the seal face wear occurs the seal band tends to move inward, thus continuously forming a new seal surface. This occurs both on the seal face of the seal ring and on the bushing and contributes to a longer seal life, especially in the presence of abrasives.

In summarizing construction of the seal ring, the flange or tail portion 47 must be of sufficient section to provide a column strength necessary to support the seal in the counterbore or groove 35 and be sufficiently stiff to provide the press fit on its circumference necessary to maintain its driving relationship with the counterbore.

The thin wall section or that portion which extends between the flange 47 and flange 49 must be sufficiently thin to allow the flange 49 to hinge in this general area. This section can be limited in thickness only to the section that can be successfully formed by molding or other methods of manufacture. It should also have sufficient body to withstand continued flexing in this area as the flange moves in and out according to the location of its mating surface 31.

The flange portion 49 should preferably be of sufficient section to provide a stiff body so as to maintain a flat surface around the entire circumference of the ring to present a flat seal band to the surface 31. This section, of course, would also be dictated by the wedge for the oil to be trapped in for purposes of lubricating the seal band as prescribed by seal face 61 and angle A. Angle C or B is of importance in that it provides sufficient length to the back face 67 to entrap the load ring 45 in a manner to prevent ingress of dirt and water between the seal ring and the load ring. The back surface 67 is limited in length which will allow it to swing freely in the counterbore and maintain intimate contact with the load ring when assembled in its operating condition. Further, angle C or B establishes the point of contact and the width of the seal band 63.

The prior art seal of U.S. Pat. No. 3,390,922 is also illustrated in FIG. 6 to provide herein a means for observing readily distinguishable features of the present seal assembly.

The prior art seal has a mid seal thickness at 51', which could be defined as the "hinge area" of about 0.150 inches. Cold weather retraction characteristics of this thick polyurethane material are limited with seal travel requirements over about 0.010 inches.

On the other hand, the present seal ring forms a deeper crescent or "C" shape with the driving flange being about 0.100 inches thick to provide a section capable of sustaining a tight radial fit. The seal face flange has a maximum thickness of about 0.130 inches to provide seal face rigidity. The center "hinge" portion of the seal is, however, about 0.040 inches thick. This is considered to be a minimum practical thickness for molding the polyurethane seal material and for accomplishing functions of the "hinge." Since section modulus and stiffness of the "hinge" area vary as the cube of the thickness, the 0.150 inch thick section of the prior art seal would be about 50 times more rigid than the 0.040 inch thick hinge section of the present seal.

Seals with somewhat thicker "hinge" areas have also been tested in various applications having different seal face travel requirements and application. Generally, the hinge section thickness of the seal ring should be no more than the maximum seal band width.

FIG. 7 further illustrates the important function of the load ring. It may be seen from this figure that little or no loading on the seal band 63 can be accomplished without cooperation of the load ring and that compression of the load ring is responsible for virtually all of the seal face loading.

These features which promote long life are critical and difficult to achieve. A track joint runs possibly submerged in mud or abrasive slurry for much of its entire life of 1,000 to 5,000 operating hours. This may take 6 months to 5 years. During this time it must survive with only the original lubricant supply, ranging from an oil wetted joint to a volume of possibly two cubic inches.

Preservation of the critical oil supply is very important. Because of the small total amount of the oil supply, oil leakage, even if occurring only for a short time, could completely drain a joint and cause failure.

The surface 31 of the bushing is also important. It has been found that after a seal face wears in it tends to polish its own seal surface on the bushing, although very rough surfaces increase seal wear. When new, however, the condition of the bushing surface has a large influence on leaking rate. Generally, grind marks or scratches running circumferentially are little problem. Grind marks that are of a spiral or radial direction or lay, though, can allow leakage of lubricant and injestion of dirt. For these reasons, medium random lapped or circular ground surfaces are most desirable. A surface having cross grind marks or radial lay must have a finish smoother than 32 micro-inches RMS to be generally acceptable.

The outside diameter of the flange 49 is sized smaller than the outside diameter of the bushing 25. It is important to make reasonable allowances on these dimensions so that in the installed position, the outside diameter of the seal lip will never slip over the edge of the bushing face 31. Allowance for effects of seal and counterbore eccentricity as well as for bushing to end clearances and internal wear must be made. If the seal band 63 slips over the outside diameter of the face 31 of the bushing, leakage and joint failure can result.

The flange 49 has an inner face 65. The angle that this inner face 65 makes with the vertical (a plane parallel to the bushing and face 31) in the free state is the heel angle and is indicated by a reference character B in FIG. 3.

The heel angle is designed so that in the installed position it will form an included angle with the bushing face 31 of between 45° and 120°.

This included angle is the angle C in FIG. 3. An angle somewhat less than 90° is preferred to best resist the action of abrasives. This angle must sometimes be compromised so that the resulting heel diameter in the installed position produces a clearance to the counterbore internal diameter small enough to prevent the load ring 45 from slipping through if it were improperly installed. The clearance to the counterbore internal diameter must be large enough to keep the seal ring from becoming cemented in by strongly adhesive materials. That is, there must be some clearance between the surface 65 of the seal ring and the surface 35 of the counterbore, but this clearance cannot be too great. The heel angle B plays a part in determining the extent of this clearance in the assembled condition of the seal.

The flange 49 includes a back face 67. The angle of this back face 67 with the vertical in FIG. 3 in the unloaded condition of the seal ring is the back angle and is indicated by the reference character D in FIG. 3. The back angle is preferably made such that in the installed position the back angle becomes negative (as illustrated in FIG. 3) tending to hold the load ring 45 in position. That is, the face 67 changes to the other side of the vertical in the installed position and tends to lock in the load ring 45. Such features improve the overall reliability of the seal package.

Referring particularly to FIG. 3, it may be seen that the seal ring has an angularly formed annular edge 69 arranged between the back face 67 and inner face 65. The edge 69 remains pressed into intimate engagement with the load ring during seal operation to prevent the entry of dirt or foreign material therebetween.

The driving force needed to make the seal band 63 turn against the bushing end face 31 is transmitted from the counterbore through the enlarged tail section or flange 47 of the seal ring 43. The normal axial force transmitted by the compressed load ring 45 through the back of the seal ring presses the back face 71 of the flange 47 into frictional engagement with the bottom wall 33 of the counterbore. This is complemented by two additional features. First, the tail section or flange 47 of the seal ring is an interference fit with the counterbore as indicated by the phantom lines in FIG. 3. Furthermore, as the crescent seal ring is compressed laterally, the flange 47 tends to expand radially, thus engaging the counterbore diameter ever tighter, creating added driving forces. This expansion is similar to that of the seal face which will be described in more detail below. Tight engagement of both the back face 71 of the flange 47 with the counterbore and the end face 73 of the flange 47 with the counterbore provides good static sealing which, of course, is also important for a long life seal functioning with a very limited life-time oil supply.

The driving force needed to make the seal band 63 turn against the bushing end face 31 is transmitted through the thin-walled hinge portion 51 of the seal ring. The load ring 45 is relieved of this duty. Torsional wind-up of the seal ring 43 is eliminated because the hard, elastomeric, polyurethane material of which the seal ring 43 is made has a torsional modulus much greater than that of the relatively soft load ring 45. Each material is thus designed to provide the function to which it is best suited.

An additional improvement of the seal is in a preferred construction of the load ring 45 itself. It has been found as the seal is made capable of effectively keeping bushing contact with ever increasing excursions that a secondary phenomenon develops. As the seal ring 43 travels in an out laterally, the flange 49 expands and contracts radially. Radial expansion and contraction forces the seal band 63 to run alternately on freshly lubricated areas and then on bushing end surfaces previously worn and exposed to abrasive dirt. This radial pumping action causes loss of lubricant and the injestion of foreign particles.

The load ring may therefore be constructed in a canted polygonal shape so that as it is compressed it will exert an inward component of force on the seal ring to counteract the expansion tendency of the seal lip or flange 49. Careful control of the load ring volume and the canting angle produces a seal package that has virtually zero radial motion even with maximum lateral or thrust movement. Control of radial movement also helps to prevent the seal band 63 from slipping over the bushing edge which as previously mentioned can be a definite problem. However, it is noted that even a load ring of uniformly circular cross-section would assume a configuration as shown in FIG. 4 under compression and would thus accomplish the major objects of the present invention.

The augmented crescent seal shown in FIG. 3 with the expansion compensated load ring 45 is capable of effective sealing with lateral bushing movement three to six times greater than with the seal construction shown in FIG. 4 of my prior U.S. Pat. No. 3,390,922.

Another embodiment of a seal constructed in accordance with the present invention is illustrated in FIG. 5. The seal 41 shown in FIG. 5 is generally similar to that shown in FIG. 3 except for the fact that radial guiding is accomplished from a surface 81 of the thrust ring 37 rather then relying on the radial guide feature of the load ring 45.

The fit between the surface 81 of the thrust ring and the abutting surface 82 of the seal ring 43 is an interference fit. This arrangement has been found effective to overcome a severe operating condition in which the oil in the wedge illustrated in FIG. 4 was freezing and was causing sliding at the surfaces 71 and 73 of the flange 47 of the seal ring rather than sliding at the seal band 63.

As in the embodiment shown in FIG. 3, the majority of the face load for the seal band 63 is developed through compression of the load ring 45. However, it may be seen that the thin dimension and flexibility of the hinge portion 51 is achieved by means of a notch formed in the seal ring 43 as indicated at 83.

While I have illustrated and described the preferred embodiments of my invention, it is to be understood that these are capable of variation an modification, and I therefore do not wish to be limited to the precise details set forth, but desire to avail myself of such changes and alterations as fall within the purview of the following claims.

In the claims:

1. A seal assembly comprising
first and second axially spaced members mounted for relative rotation about a common axis, the first member having a counterbore formed in one face, the second member having an end face opposite the counterbore,
a seal ring of tough abrasion resistant material having a crescent shape in cross-section disposed in the counterbore with the crescent shaped cross section defining an annular groove facing the sidewall of the counterbore, the seal ring including a driving flange engaged in non-rotative driving contact with the sidewall and an end wall of the counterbore at the juncture of these walls, a sealing flange engaged in annular face sealing rotative contact with the end face of the second member, the driving said sealing flanges being interconnected by a wall section of substantially thinner cross section than that of the flanges, the thin dimension imparting thereto a substantial lateral flexibility while retaining a torsional modulus characteristic of the tough abrasion resistant material, and a load ring of elastomeric material having substantial spring response characteristics, said load ring being disposed within the annular groove of the crescent shaped seal ring and engaging substantially the entire inner wall surface of the sealing flange and being axially compressed between the driving flange and the sealing flange, the interconnecting thin wall section having a resiliency and torsional modulus such that virtually all driving torque is transmitted from said driving flange to said seal flange therethrough, whereas virtually all of the seal flange face load is derived from compression of said load ring.

2. The seal assembly of claim 1 wherein the load ring has a polygonal shape in cross-section.

3. The seal assembly of claim 2 wherein the seal is subjected to dynamic conditions of operation in which the end face of the second member may move axially toward and away from the counterbore through distances sufficiently large to produce rapid and substantial axial compression and expansion of the seal ring and the load ring and wherein the polygonal shape of the load ring is canted to an area of contact including the juncture of the sealing flange and the thin wall section to concentrate thereagainst under axial compression, a radially inwardly directed force to counteract a tendency of the sealing flange toward radial excursions during variations in such compression and thus to maintain the band of sealing contact between the seal ring and second member at substantially the same radial location during such dynamic conditions of operation.

4. The seal assembly of claim 1 wherein the tough sealing flange extends sufficiently close to the sidewall of the counterbore to prevent the elastomeric load ring from extruding into the space between the outer radial edge of the sealing flange and the sidewall of the counterbore.

5. The seal assembly of claim 4 wherein the sealing flange includes a surface comprising a face presented to the load ring, the face being inclined at a negative angle in the installed condition of the seal to partially embrace and thus to hold the load ring in position.

6. The seal assembly of claim 1 wherein the sealing flange includes an outer radial edge, the edge when in the installed condition of the seal forming an angle with the end face in the range of 45° to 120°.

7. The seal assembly of claim 6 wherein the angle is less than 90°.

8. The seal assembly of claim 1 wherein the sealing flange is spaced apart from the sidewall of the first member while extending sufficiently close thereto to prevent the load ring from extruding through the space between a radial edge of the sealing flange and the sidewall of the first member.

9. The seal assembly of claim 8 wherein the sealing flange has an angularly formed annular edge which remains pressed into intimate engagement with the load ring during operation of the seal assembly to prevent the entry of foreign material therebetween.

10. A seal assembly in an annular cavity formed by first and second members which are subject to relative rotation, the first member forming the axially facing end wall and a radially facing sidewall of the cavity, the second member having an end face forming another axially facing end wall of the cavity opposite the one axially facing end wall, comprising a seal ring of tough abrasion-resistant material having a crescent shape in cross-section, the seal ring being disposed in the annular cavity with an annular groove of the crescent-shaped seal ring facing the sidewall of the cavity, the seal ring having a driving flange engaged in non-rotative driving contact with the sidewall and the one end wall of the cavity at the junction of these walls and a sealing flange engaged in face sealing rotative contact with the end face of the second member, the seal ring also having a thin-wall section connecting the flanges and providing a flexible hinge therebetween, and a load ring of resilient elastomeric material being disposed adjacent the sidewall of the first member and encompassed by the crescent-shaped cross-section of the seal ring and engaging substantially the entire inner wall surface of the sealing flange whereby the load ring is axially compressed between the driving flange and the sealing flange, axially acting forces for urging the sealing flange against the end wall of the second member and maintaining substantially constant sealing engagement therebetween are provided substantially by compression of the load ring.

11. The seal assembly of claim 10 wherein a surface on the sealing flange angularly engages the end wall of the second member, the surface on the sealing flange being sufficiently resilient to form a narrow band annular seal surface in contact with the end wall of the second member under axial force provided substantially by the load ring.

12. The seal assembly of claim 11 wherein the driving flange of the seal ring is sized to provide an interference fit with the sidewall of the first member, the driving flange also being urged into driving engagement with the end wall of the first member, the hinge section of the seal ring being formed with sufficient strength so that driving torque is transmitted between the driving flange and sealing flange substantially by the thin wall hinge section rather than the load ring.

13. The seal assembly of claim 10 wherein the driving flange of the seal ring is sized to provide an interference fit with the sidewall of the first member, the driving flange also being urged into driving engagement with the end wall of the first member, the hinge section of the seal ring being formed with sufficient strength so that driving torque is transmitted between the driving flange and sealing flange substantially by the thin wall hinge section rather than the load ring.

14. The seal assembly of claim 10 wherein the sealing flange is spaced apart from the sidewall of the first member while extending sufficiently close thereto to prevent the load ring from extruding through the space between a radial edge of the sealing flange and the sidewall of the first member.

15. The seal assembly of claim 14 wherein the sealing flange has an angularly formed annular edge which remains pressed into intimate engagement with the load ring during operation of the seal assembly to prevent the entry of foreign material therebetween.

16. The seal assembly of claim 10 wherein the seal ring has relatively poor spring characteristics particularly at low temperatures because of its selection for abrasion resistance, the load ring being formed from an elastomeric material with good spring characteristics even at low temperatures.

17. The seal assembly of claim 16 wherein the seal ring is a polyurethane elastomer having a high torsional modulus.

18. The seal assembly of claim 10 wherein the seal ring is formed from material selected to have a high torsional modulus and the load ring is formed from an elastomeric material having good spring retraction characteristics even at low temperatures, the thin wall section of the seal ring having suitable resiliency and a torsional modulus such that driving torque is transmitted from the driving flange to the sealing flange substantially by the thin wall section while substantially all of the seal flange face load is derived from compression of the load ring.

19. A seal assembly for a linkage of the kind in which an outer link and an inner link have overlapping ends joined in a pin joint connection providing for relative rotation about a pin which extends through the ends of both links, the pin being connected to the outer link and rotating within a bushing connected to the inner link, the bushing having an end face facing a counterbore in the inner face of the outer link, the seal assembly comprising an annular seal ring of crescent-shaped cross-section embracing a load ring within the counterbore, the seal ring being a tough, abrasion-resistant material with relatively poor spring characteristics at low temperature and having a drive end pressed into frictional driving engagement with the side wall and end wall of the counterbore, a sealing end having an outer surface a narrow width portion of which comprises a seal band pressed into rotatable sealing contact with the end face of the bushing, and a wall section interconnecting the drive and said seal ends, the wall section being of thin cross-section relative to that of the ends whereby to provide a flexible, hinge-type action, the load ring being an elastomeric compound with good spring retraction characteristics at low temperature and having a polygonal shape in cross section, the load ring being compressed within the annular groove formed between the embracing drive and sealing ends of the crescent-shaped seal ring with a portion of the load ring engaging substantially the entire inner wall surface of the sealing band to produce the major part of the face load for the seal end and wherein the relative configurations and dimensions of the drive end and said counterbore produce an interference fit therebetween effective to transmit the driving torque from the outer link through the seal ring without the need to rely on driving contact through the load ring.

* * * * *